(12) United States Patent
Kimura et al.

(10) Patent No.: US 8,876,451 B2
(45) Date of Patent: Nov. 4, 2014

(54) HIGH-STRENGTH BOLT

(75) Inventors: Yuuji Kimura, Tsukuba (JP); Tadanobu Inoue, Tsukuba (JP); Shuji Murasaki, Takatsuki (JP); Mataichi Fukuda, Komatsu (JP)

(73) Assignees: National Institute for Materials Science, Ibaraki (JP); Fusokiko Co., Ltd., Osaka (JP); Kyowa Kogyosyo Co., Ltd., Ishikawa (JP)

(*) Notice: Subject to any disclaimer, the term of this patent is extended or adjusted under 35 U.S.C. 154(b) by 394 days.

(21) Appl. No.: 13/395,298

(22) PCT Filed: Sep. 10, 2010

(86) PCT No.: PCT/JP2010/065617
§ 371 (c)(1),
(2), (4) Date: May 23, 2012

(87) PCT Pub. No.: WO2011/030853
PCT Pub. Date: Mar. 17, 2011

(65) Prior Publication Data
US 2012/0230800 A1 Sep. 13, 2012

(30) Foreign Application Priority Data
Sep. 10, 2009 (JP) ................. 2009-209581

(51) Int. Cl.
| | | |
|---|---|---|
| *F16B 35/00* | (2006.01) | |
| *C22C 38/00* | (2006.01) | |
| *C22C 38/58* | (2006.01) | |
| *C21D 8/06* | (2006.01) | |
| *C21D 9/00* | (2006.01) | |
| *C22C 38/06* | (2006.01) | |
| *C22C 38/02* | (2006.01) | |
| *C22C 38/04* | (2006.01) | |
| *C22C 38/34* | (2006.01) | |
| *F16B 35/04* | (2006.01) | |
| *C22C 38/22* | (2006.01) | |

(52) U.S. Cl.
CPC .............. *F16B 35/041* (2013.01); *C22C 38/06* (2013.01); *C22C 38/02* (2013.01); *C22C 38/04* (2013.01); *C21D 8/06* (2013.01); *C22C 38/001* (2013.01); *C22C 38/34* (2013.01); *C21D 9/0093* (2013.01); *C22C 38/22* (2013.01)
USPC ............. 411/424; 420/91; 420/105; 420/110; 420/118; 420/128

(58) Field of Classification Search
CPC ...... F16B 4/004; F16B 33/006; F16B 35/041; F16B 35/04; F16B 33/004; F16B 21/086; F16B 19/004; F16B 21/02; F16B 19/02; F16B 19/06; C22C 38/42; C22C 38/44; C22C 38/46; C22C 38/54; C22C 38/22; C22C 38/02; C22C 38/12; C22C 38/28; C22C 38/26; C22C 38/24; C22C 38/14; B23K 35/3053; B23K 35/308; C21C 7/00; C21C 7/06; C21D 1/20; C21D 8/04; C21D 8/0426; C21D 8/0436; C21D 8/0473; C21D 8/0478
USPC ............ 411/424, 500; 420/91, 105, 110, 118, 420/128
See application file for complete search history.

(56) References Cited

U.S. PATENT DOCUMENTS

| | | | | | |
|---|---|---|---|---|---|
| 6,009,759 | A | * | 1/2000 | Kibblewhite et al. | ........... 73/761 |
| 6,386,810 | B1 | * | 5/2002 | Onoe | ............................. 411/411 |

(Continued)

FOREIGN PATENT DOCUMENTS

| | | |
|---|---|---|
| CN | 1460156 A | 12/2003 |
| CN | 101142335 A | 3/2008 |

(Continued)

OTHER PUBLICATIONS

Uno, Nobuyoshi et al., "Super-High-Strength Bolt, 'SHTB'", The Forefront of Strengthening Technology in High Strength Bolted Joint, The 2008 Architectural Institute of Japan Meeting.

(Continued)

Primary Examiner — Gay Ann Spahn
(74) Attorney, Agent, or Firm — The Webb Law Firm

(57) ABSTRACT

Provided is a high-strength bolt which has a tensile strength of 1,200 MPa or more while exhibiting excellent ductility and delayed facture resistance, and further has an excellent impact toughness which had not been obtained in the conventional high-strength bolt. The high-strength bolt has a tensile strength of 1.2 GPa or more and includes a threaded portion and cylindrical neck portion. The bolt has K of 0.8 or more and satisfies Ho<Hs, where K is defined by the equation: $(A_o \times H_o)/(A_s \times H_s) = K$, in which $A_o$ is an effective cross-sectional area of the cylindrical neck portion with a diameter larger than that of the threaded portion, $H_o$ is a Vickers hardness of a portion at which $A_o$ is measured, $A_s$ is an effective cross-sectional area of the threaded portion, and $H_s$ is a Vickers hardness of the threaded portion.

4 Claims, 4 Drawing Sheets

(56) References Cited

U.S. PATENT DOCUMENTS

| | | | |
|---|---|---|---|
| 6,605,166 B2 | 8/2003 | Koike et al. | |
| 8,070,888 B2* | 12/2011 | Torizuka et al. | 148/320 |
| 2003/0150529 A1 | 8/2003 | Uno et al. | |
| 2005/0271496 A1* | 12/2005 | Torizuka et al. | 411/424 |
| 2007/0017610 A1* | 1/2007 | Yoshida et al. | 148/654 |
| 2007/0187003 A1* | 8/2007 | Takashima et al. | 148/320 |
| 2007/0224017 A1* | 9/2007 | Pamer | 411/162 |
| 2008/0110535 A1 | 5/2008 | Oi et al. | |
| 2009/0015010 A1* | 1/2009 | Itoi et al. | 285/368 |
| 2009/0277539 A1 | 11/2009 | Kimura et al. | |
| 2010/0008716 A1* | 1/2010 | Mori et al. | 403/408.1 |
| 2010/0173716 A1* | 7/2010 | Torizuka et al. | 470/8 |
| 2012/0076612 A1* | 3/2012 | Bryan | 411/204 |
| 2012/0270059 A1* | 10/2012 | Zoz et al. | 428/457 |
| 2013/0022427 A1* | 1/2013 | Yamanaka et al. | 411/411 |

FOREIGN PATENT DOCUMENTS

| | | |
|---|---|---|
| EP | 1956100 A1 | 8/2008 |
| JP | 2278005 A | 11/1990 |
| JP | 09-263876 A * | 7/1997 |
| JP | 10141341 A | 5/1998 |
| JP | 2001348618 A | 12/2001 |
| JP | 2006104549 A | 4/2006 |
| JP | 3861137 B2 | 12/2006 |
| JP | 2006328473 A | 12/2006 |
| WO | 2007058364 A1 | 5/2007 |

OTHER PUBLICATIONS

Kimura, Yuuji et al., "Fabrication of Ultra High Strength Bolt and Its Mechanical Properties", Steel Construction Engineering, 2007, pp. 121-127, vol. 14 (with English Abstract).

Steels: Heat Treatment and Processing Principles, ASM International, 1990, p. 14.

Kimura, Yuuji et al., "Inverse Temperature Dependence of Toughness in an Ultrafine Grain-Structure Steel", Science Magazine, May 23, 2008, pp. 1057-1060, vol. 320.

* cited by examiner

HIGH-STRENGTH BOLT

TECHNICAL FIELD

The present invention relates to a high-strength bolt having a tensile strength of 1,200 MPa or more.

BACKGROUND ART

Recent trends of increase in size of structures and weight saving of automotive parts have been raising a need for high-strength metal materials stronger and tougher than ever. Among these, steel materials, such as sheet steel and shaped steel, have been demanded to have high strength. At the same time, there has been also demanded strengthening of bolt that is used for jointing those steel materials (see, for instance, Patent Document 1 and Non-Patent Document 1).

Mechanical properties required for materials of the bolt are: (1) good formability; (2) high resistance to delayed fracture; (3) excellent resistance to environmental deterioration; (4) excellent impact toughness; and the like. However, these properties and an increase in strength of materials are in a trade-off relationship.

In the steel material having a tensile strength of more than 1,200 MPa, especially a delayed fracture is a serious problem, which hinders strengthening of the high-strength bolt. The delayed fracture, a shortened term for "time-delayed fracture", is a fracture resulting from embrittlement of the steel material caused by hydrogen which has been generated by an atmospheric corrosion and intruded into steel material. The cause of the delayed fracture is thus the hydrogen which is diffused and concentrated in the steel at room temperature. Because of this delayed fracture, development of the high-strength bolt for construction works had been stagnated at a tensile strength of up to 1,100 MPa for approximately 30 years until late 1990s when a super-high-strength bolt having a tensile strength of 1,400 MPa was developed (see, for example, Non-Patent Document 1).

In general, the production of high-strength bolt includes the following steps: softening a steel material; forming a bolt head portion by cold heading; forming a threaded portion by cold rolling; and quenching and tempering of the bolt. Patent Document 2 discloses that the high-strength steel for machine structure having a tensile strength of 1,800 MPa or more and excellent delayed fracture resistance was obtained by defining tempering conditions and additive amounts of C, Si, Mn, Cr, and Mo. Also, a production method and mechanical properties of the super-high-strength bolt using this 1,800 MPa-class high-strength steel for machine structure has been reported (Patent Document 2). However, it is pointed out that, with respect to the above high-strength steel material, it is difficult to soften the material and form a head portion by cold heading, and in the case of bolt shape be defined in accordance with Japanese Industrial Standard (JIS), the delayed fracture property has not yet been completely overcome (Non-Patent Document 2).

Since the quenching and tempering process of bolt is complicated, there is a production method in which the quenching and tempering treatment is omitted (untempered bolt). Patent Document 3 discloses that a wire rod that was prepared by heavily cold drawing of steel material having fine pearlite structure was used as a blank to obtain a bolt-shaped material by cold heading and that the delayed fracture property and relaxation can be ameliorated by performing a strain ageing treatment to the bolt-shaped material. Patent Document 1 also discloses that, after forming a bolt, low-temperature toughness was improved by applying a tensile stress of an elastic limit or lower to the bolt and performing a heat treatment thereto. However, since these methods are performed on condition that the bolt is formed in cold working, a shape and a size of the bolt are limited. Further, since it is necessary to set an amount of carbon to 0.7 percent by weight or more, a remarkable improvement of impact toughness cannot be expected. Herein, percent by weight is equivalent to percent by mass.

CITATION LIST

Patent Documents

Patent Document 1: Japanese Unexamined Patent Application Publication No. 2006-328473
Patent Document 2: Japanese Patent No. 3861137
Patent Document 3: Japanese Unexamined Patent Application Publication No. 2001-348618
Patent Document 4: PCT Publication No. 2006/323248

Non-Patent Documents

Non-Patent Document 1: The Forefront of Strengthening Technology in High Strength Bolted Joint, The 2008 Architectural Institute of Japan Meeting (Chugoku branch), Structure Section (Steel Structure), panel discussion material
Non-Patent Document 2: Steel Construction Engineering, Vol. 14, No. 54 (2007) pp. 121-127
Non-Patent Document 3: Steels: Heat Treatment and Processing Principles, ASM International, (1990), p. 14
Non-Patent Document 4: Science, 320, (2008), pp. 1057-1060

SUMMARY OF INVENTION

Technical Problem

The present invention has been made with the focus on the above mentioned circumstances and the object of the present invention is to provide a high-strength bolt which has a tensile strength of 1,200 MPa (1.2 GPa) or more while exhibiting excellent ductility and delayed facture resistance, and further has an excellent impact properties which had not been obtained in the conventional high-strength bolt.

Solution to Problem

The feature of the high-strength bolt of Invention 1 lies in that the bolt has K of 0.8 or more and satisfies Ho<Hs, K being defined by the following equation (1):

$$(Ao \times Ho)/(As \times Hs) = K \quad (1)$$

wherein
Ao is an effective cross-sectional area of the cylindrical neck portion having a diameter larger than that of the threaded portion,
Ho is a Vickers hardness of a portion at which Ao is measured,
As is an effective cross-sectional area of the threaded portion, and
Hs is a Vickers hardness of the threaded portion.

The feature of Invention 2 lies in that the high-strength bolt according to Invention 1 includes: less than 0.7 percent by weight of C; 3 percent by weight or less of Si; 3 percent by weight or less of Mn; 3 percent by weight or less of Cr; 0.5 percent by weight or less of Al; 0.3 percent by weight or less of O; 0.3 percent by weight or less of N; 5.0 percent by weight or less of Mo; 10 percent by weight or less of Ni; 2.0 percent by weight or less of Cu; 1.0 percent by weight or less of Nb; and the balance substantially of Fe and unavoidable impurities.

The feature of Invention 3 lies in that the high-strength bolt according to any of Inventions 1 or 2 has a grain dispersion type fibrous structure.

Advantageous Effects of Invention

The longstanding demand for the practical high-strength bolt has been fulfilled by a warm forming process with the use of a conventional bolt making machine, which bolt has a high strength level of 1,200 MPa (1.2 GPa) or more while exhibiting excellent ductility, delayed fracture resistance, and in particular, high impact toughness.

This is due to the following facts: by setting Ho smaller than Hs and setting K of the above equation (1) within the above range, the head portion of the high-strength bolt, the heading of which had been difficult, can be subjected to the heading by means of a warm forming process with the use of a conventional bolt making machine at a temperature higher than that for the threaded portion; and by imparting hardness to the cylindrical neck portion and the head portion which hardness becomes gradually lower away from the threaded portion, ductility, impact toughness and delayed fracture resistance, which are in a trade-off relationship with an increase of hardness, can be enhanced at the cylindrical neck portion and the head portion.

DESCRIPTION OF EMBODIMENTS

Figure 1:
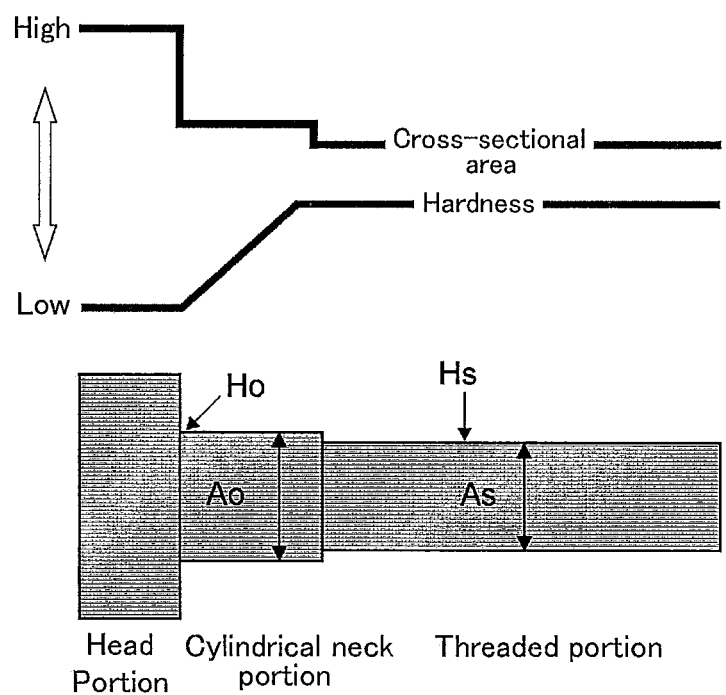
FIG. 1 is a schematic diagram showing a distribution of Vickers hardness and properties of a bolt.
Figure 2:
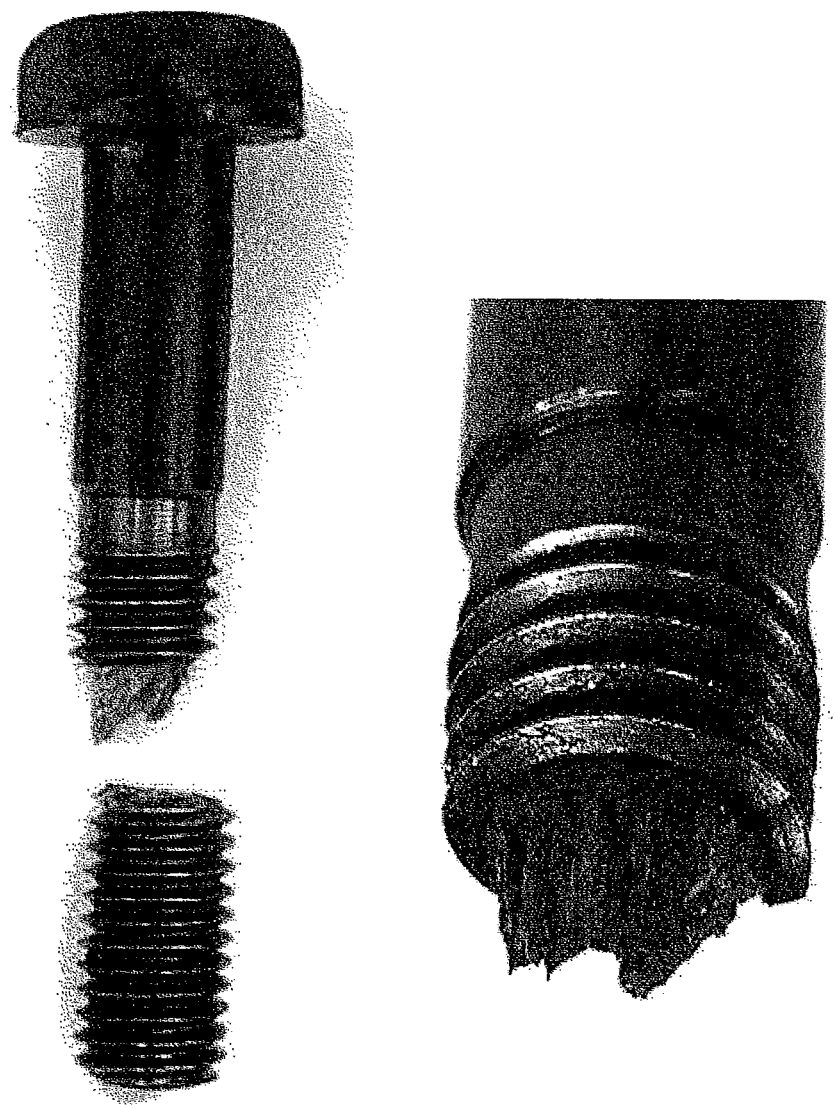
FIG. 2 shows enlarged pictures of a ruptured part and a vicinity thereof, after a tensile test, of a bolt of SNo. 4 (Example) in Table 3.
Figure 3:
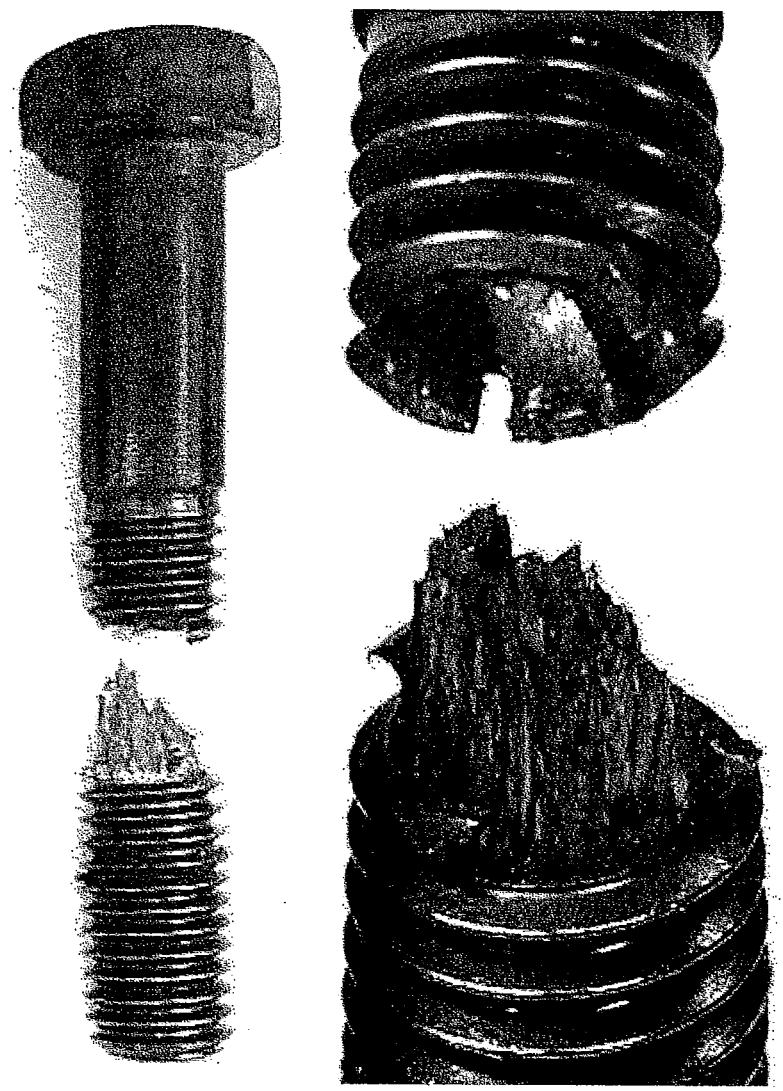
FIG. 3 shows enlarged pictures of a ruptured part and a vicinity thereof, after a tensile test, of a bolt of SNo. 5 (Example) in Table 3.
Figure 4:
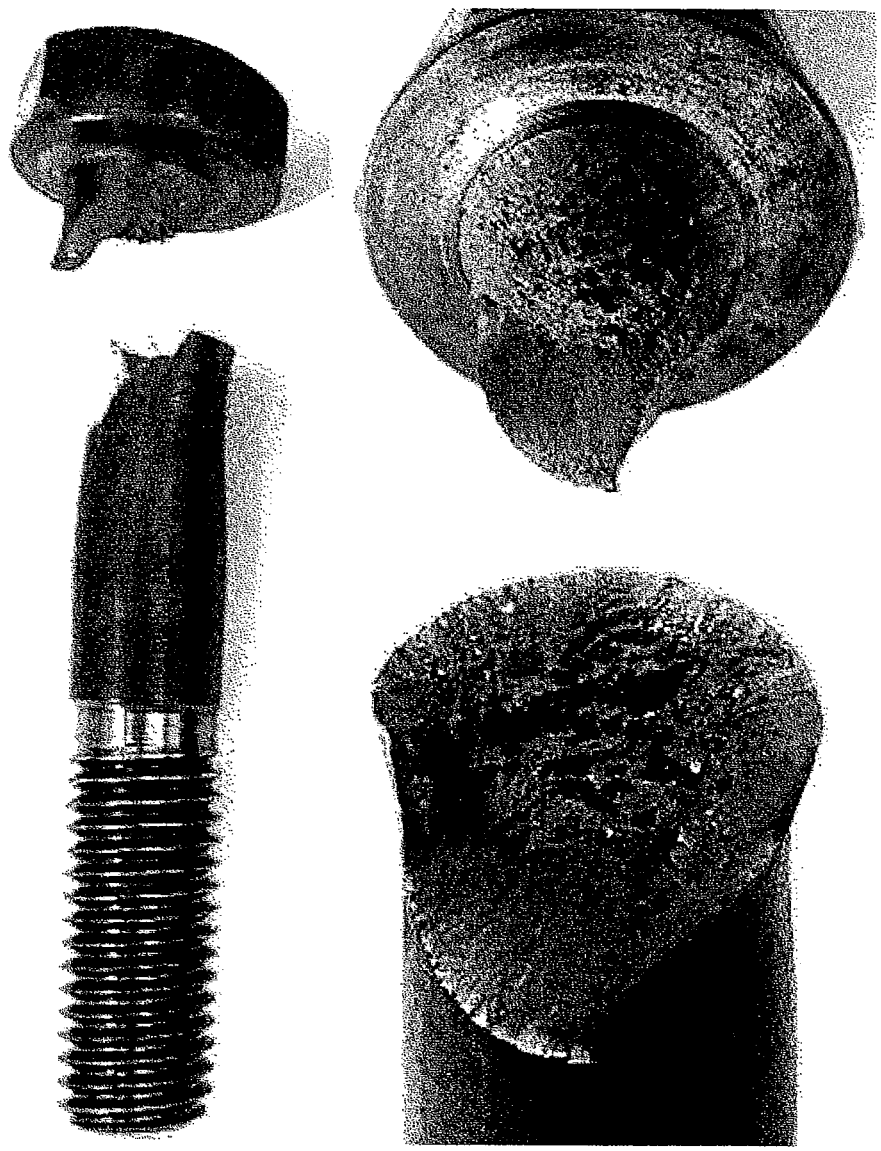
FIG. 4 shows enlarged pictures of a ruptured part and a vicinity thereof, after a tensile test, of a bolt of SNo. 6 (Comparative Example) in Table 3.

As described above, with respect to the steel, there is a trade-off relationship between the hardness (strength) and the properties such as delayed fracture resistance, toughness, ductility, and formability. That is, based on the inventors' findings that the properties including delayed fracture resistance, toughness, ductility, and formability are enhanced as the hardness (strength) decreases, the present invention has been made by adjusting the hardness of the steel, as shown in FIG. 1, and enhancing the fracture resistance, toughness, ductility, and formability of the head portion.

The equation (1) shows that the structure of the cylindrical neck portion is softer than that of the threaded portion, in which K is 0.8 or more, preferably 0.9 or more, more preferably 1. When K is less than 0.8, the bolt ruptures not at the threaded portion but at the cylindrical neck portion.

Also, when K is too large, the diameter of the cylindrical neck portion becomes too large, which hinders the bolt from fully exerting a function as a bolt, and thus it is apparent that there is an upper limit. When the versatility of the bolt is taken into consideration, it is preferable that the bolt shape be those defined in accordance with the JIS standard. In this case, it is preferable to set K to 1.3 or less.

The above structure can be obtained by processing the quenched material or quenched and tempered material according to the following processes.

First, an end portion of the material to be formed as the head portion of the bolt is heated at a temperature in a range of from 350° C. to Ac1 (precipitation starting temperature of an austenite phase)+20° C., and processed into a head shape by heading. Then, the bolt is rolled to form the threaded portion at a heating temperature lower than that for the head portion. Herein, a rolling temperature of the threaded portion may vary depending on the formability of the steel material, and may be at room temperature.

Further, for example, in the case of the chemical compositions shown in Table 1, Ac1 for Materials A and B are 795° C. and 740° C., respectively, calculated based on the well-known empirical formula (Non-Patent Document 3). However, it has been conventionally known that, in the case that the material is rapidly heated with the use of a radio-frequency heating apparatus, Ac1 tends to shift towards a high temperature-side in comparison to the above calculated Ac1. Taking this into consideration, the above mentioned temperature range is deemed to be more practical.

Since the chemical composition in the present invention is not limited to those shown in Table 1, it is apparent that, when another composition is used that meets the conditions of the present invention, the temperature is not limited to those described above, and can be easily obtained from the well-known empirical formula for Ac1.

A preferable chemical composition of the steel material to be processed into the high-strength bolt of the present invention by the above processing method is as follows.

When an amount of C is less than 0.7 percent by weight, it is preferable that the composition includes: 3 percent by weight or less of Si; 3 percent by weight or less of Mn; 3 percent by weight or less of Cr; 0.5 percent by weight or less of Al; 0.3 percent by weight or less of O; 0.3 percent by weight or less of N; 5.0 percent by weight or less of Mo; 10 percent by weight or less of Ni; 2.0 percent by weight or less of Cu; and 1.0 percent by weight or less of Nb.

C: C forms carbide particles and is the most effective element for increasing strength. However, when the amount exceeds 0.70 percent by weight, C deteriorates toughness, and thus the amount of C is set to less than 0.70 percent by weight. In order to satisfactorily achieve the possible increase of strength, it is preferable to set the amount of C to 0.08 percent by weight or more, more preferably, 0.15 percent by weight or more.

Si: Si is effective for deoxidation, for enhancement of the strength of the steel by dissolving in ferrite, and for fine dispersion of cementite. Thus, it is preferable that the amount of Si is set to 0.05 percent by weight or more, which includes those having been added as deoxidant and remaining in the steel. For the purpose of achieving high-strengthening, the upper limit of the amount of Si is not set. However, when workability of steel material is taken into consideration, it is preferable to set the amount of Si to 2.5 percent by weight or less.

Mn: Mn is effective for lowering an austenitizing temperature and for refining austenite, and has an effect of controlling hardenability and retarding cementite coarsening by dissolving in the cementite. Since a desired effect will hardly be obtained with the amount of less than 0.05 percent by weight, it is preferable to set the amount of Mn to 0.05 percent by weight or more. It is more preferable to set the amount to 0.2 percent by weight or more. For the purpose of achieving high-strengthening, the upper limit of the amount of Mn is not set. However, when the toughness of the resultant steel material is taken into consideration, it is preferable to set the amount of Mn to 3.0 percent by weight or less.

Cr: Cr is effective for improving hardenability, and has a strong effect of delaying growth of cementite by dissolving in the cementite. Cr is one of the important elements in the present invention in that an addition of Cr in a relatively large amount contributes to formation of high chromium carbide which is thermally more stable than cementite, and enhancement of corrosion resistance. Thus, it is preferable to include at least 0.01 percent by weight or more of Cr. Cr is included in an amount of preferably 0.1 percent by weight or more, more preferably 0.8 percent by weight or more. The upper limit is 3 percent by weight or less.

Al: Al is effective for deoxidation and for enhancing steel strength by forming an intermetallic compound with elements, such as Ni. However, since an excessive addition deteriorates the toughness, the amount is set to 0.5 percent by weight or less. In the case that the intermetallic compound of Al with other elements and a nitride or oxide of Al are not used as particles of secondary phase dispersion, it is preferable to set an additive amount to 0.02 percent by weight or less, further limitingly, 0.01 percent by weight or less.

O: O (oxygen) effectively serves as grain growth control particle and dispersion strengthening particle rather than an inclusion, if O as oxide is fine and uniformly dispersed. However, since an excessive addition will deteriorate the toughness, the amount is set to 0.3 percent by weight or less. In the case that the oxide is not used as particle of secondary phase dispersion, it is preferable to set the amount to 0.01 percent by weight or less.

N: N (nitrogen) effectively serves as grain growth control particle and dispersion strengthening particle, if N as nitride is fine and uniformly dispersed. However, since an excessive addition will deteriorate the toughness, the amount is set to 0.3 percent by weight or less. In the case that the nitride is not used as particle of secondary phase dispersion, it is preferable to set the amount to 0.01 percent by weight or less.

Mo: Mo is an effective element in the present invention for achieving high-strength of the steel, and not only improves the hardenability of the steel, but Mo in a small quantity also dissolves in the cementite to make the cementite thermally stable. In particular, Mo contributes to the strengthening of the steel by secondary hardening, through nucleation of alloy carbide at dislocations in the matrix phase, separately from the cementite. In addition, the formed alloy carbide is effective for hydrogen trapping as well as grain refining. Thus, it is preferable to set the amount to 0.1 percent by weight or more, more preferably 0.5 percent by weight or more. However, Mo is expensive and an excessive addition thereof forms coarse insoluble carbide or intermetallic compound that deteriorates the toughness. Therefore, the upper limit of Mo amount is set to 5 percent by weight. From economical viewpoint, it is preferable to set the amount to 2 percent by weight or less.

In addition, W, V, Ti, Nb, and Ta also show similar effects as Mo, and the above upper limit corresponding to the above amount is set for each element. Further, a combined addition of these elements is effective for finely dispersing the dispersion-strengthening particles.

Ni: Ni is effective for improving the hardenability, and has an effect of refining the austenite by lowering the austenitizing temperature, and of enhancing the toughness and corrosion resistance. Also, an addition of Ni in an appropriate amount contributes to precipitation-strengthening of the steel by forming an intermetallic compound with Ti or Al. Since a desired effect cannot be obtained with the amount of less than 0.01 percent by weight, it is preferable to set the amount to 0.01 percent by weight or more. It is more preferable to set the amount to 0.2 percent by weight or more. While the upper limit of the amount of Ni is not set, it is preferable to set the upper limit to 9 percent by weight or less since Ni is an expensive element.

Cu: While Cu is a harmful element which can cause hot shortness, an addition of Cu in an appropriate amount contributes to a precipitation of fine Cu particles at 500° C.-600° C. which strengthen the steel. Since an addition in a large amount will cause hot shortness, the amount of Cu is set to 2 percent by weight or less which is almost the maximum dissolving amount in the ferrite.

In the case where enhancement of high-strengthening by precipitation of the fine intermetallic compound is desired, it is also effective to include Co in an amount of 15 percent by weight or less.

While no particular amounts are specified for P (phosphorus) and S (sulphur), it is desirable to eliminate P and S as much as possible, since they deteriorate grain boundary strength, and thus the amount of each element is set to 0.03 percent by weight or less.

Further, it is acceptable to include various elements other than the above-mentioned elements, as long as they do not deteriorate the effect of the present invention.

It has been reported that, when the steel material is produced which has a particle dispersion type fibrous grain structure, the ductility, delayed fracture resistance, and in particular, impact toughness are improved remarkably in comparison to the conventional steels, even though the tensile strength is 1,500 MPa or more. (see Patent Document 4 and Non-Patent Document 4)

In the present invention, such a bolt having the above particle dispersion type fibrous grain structure can be produced in the following manner.

The material is quenched and tempered before bolt formation. The tempered material is subjected to a warm working with a reduction in cross-sectional area of 30% or more, in a temperature range of from 350° C. to Ac1 of steel +20° C. to thereby obtain a fibrous structure in a longitudinal direction. Subsequently, the head portion is formed in a warm temperature range in which a heading is possible. The threaded portion is formed by thread rolling in a temperature range lower than that for the head portion so that the fibrous structure is not lost. This allows the threaded portion to have remarkably enhanced ductility, delayed fracture resistance, and toughness. As a result, a high-strength bolt is produced which is stronger and tougher.

Herein, the warm temperature range is set from 350° C. to Ac1+20° C. Since a rapid plastic deformation is applied during the heading of the head portion, the generated heat can raise the temperature exceeding the above temperature range, even when the temperature before working is within the above temperature range. Nevertheless, this is a temporary phenomenon, and the metal structure will not be coarsened.

In order to reliably obtain the material with the particle dispersion type fibrous grain structure before bolt forming, it is necessary to pay attention not only to the processing conditions but also to the chemical composition of the steel.

In the present invention, after examining effects that varied depending on the rolling process conditions and the bolt processing conditions with the use of the steels including various components, it was found that, in order to obtain excellent properties, especially toughness, it is desirable that the amount of C is set to less than 0.7 percent by weight, preferably 0.6 percent by weight or less, more preferably 0.5 percent by weight or less. Also, in order to obtain high-strengthening by increasing the hardenability and temper softening resistance, it is preferable to contain 3 percent by weight or less of Si, 3 percent by weight or less of Mn, 3 percent by weight or less of Cr, 0.5 percent by weight or less of Al, 0.3 percent by weight or less of O, 0.3 percent by weight or less of N, 5.0 percent by weight or less of Mo, 10 percent by weight or less of Ni, 2.0 percent by weight or less of Cu, and 1.0 percent by weight or less of Nb.

Hereinbelow, the present invention will be further described in detail using the following Examples, while the present invention is not limited to these Examples.

EXAMPLES

Table 1 shows chemical compositions of the steels used for bolt materials. Material A includes the chemical composition of the steel which showed excellent performance in the delayed fracture resistance disclosed in Reference 2. Material B corresponds to an SCM440 steel according to JIS. For the quenched and tempered materials, steel bars with a cross section of approximately 2 cm$^2$ were prepared. The steel bars of Materials A and B were quenched from 950. and 920., respectively, and then tempered at 500. and 400., respectively, for 1 hour. As for the particle dispersion type fibrous grain structure materials, squared bars with a cross section of approximately 9 cm$^2$ were prepared. Then, the bars of Materials A and B were quenched from 950. and 920., respectively, to thereby obtain full martensite structures of almost 100 percent by volume. Herein, the prior austenite grain size in the quenched structure was approximately 50 μm. Subsequently, Materials A and B were tempered at 500. and 400., respectively, for 1 hour, then subjected to a groove rolling mill to thereby prepare bars having a cross section reduced to 2 cm$^2$. Table 2 shows mechanical properties of the particle dispersion type fibrous grain structure materials from Materials A and B (AF and BF, respectively), and the quenched and tempered materials from Materials A and B (AQ and BQ, respectively). In particular, when the microstructure of the material was the particle dispersion type fibrous structure, with respect to V-notch Charpy impact absorbed energy (JIS-Z-2242), a satisfactorily high value of 100 J or more was obtained even though the tensile strength was 1,500 MPa or more.

TABLE 1

| Steel type | A | B |
| --- | --- | --- |
| C | 0.39 | 0.4 |
| Si | 2.01 | 0.2 |
| Mn | 0.21 | 0.7 |
| P | <0.001 | 0.01 |
| S | <0.001 | 0.002 |
| Ni | — | 0.23 |
| Cr | 1.02 | 1 |
| Mo | 1 | 0.17 |
| Al | 0.004 | 0.012 |
| Cu | — | 0.04 |
| O | 0.001 | — |
| N | 0.0022 | — |
| Fe | bal. | bal. |

TABLE 2

| Example No. | Steel type | Proof stress (GPa) | Tensile strength TS(GPa) | Total elongation (%) | Reduction in area (%) | V-notch Charpy impact toughness vE20(J) |
| --- | --- | --- | --- | --- | --- | --- |
| 1 | AF | 1.86 | 1.87 | 14.3 | 43 | 277 |
| 2 | AQ | 1.51 | 1.82 | 9.2 | 28 | 14 |
| 3 | BF | 1.52 | 1.53 | 10.9 | 46 | 105 |
| 4 | BQ | 1.44 | 1.61 | 8.6 | 43 | 13 |

Upon producing the bolt, first, an end portion of each of the obtained bar-shaped steel materials was heated at the temperature shown in Table 3 to form a bolt head. Then, the bolt was heated at the tempering temperature in such a manner that the material properties are not reduced, and then the threaded portion was formed with a thread rolling die, to thereby obtain a bolt of M12 standardized in JIS. The mechanical properties of the obtained bolt are shown in Table 3. With respect to a cross-sectional part, that was obtained by cutting the bolt along a long axis and buffing the cutting surface to mirror finish, hardness was measured in accordance with a testing method prescribed in JIS-Z-2244 with the use of a Vickers hardness tester at a load of 1 kg for retention time of 15 seconds. The tensile property of the bolt products were evaluated by a tensile test with the use of a wedge (wedge angle of 4°) in accordance with JIS-B-1186.

In Table 3, S Nos. 1, 4, 5, 7, 9-13, and 16 are Examples of the present invention, and the others are Comparative Examples.

In a column of "ruptured portion", those mentioned as "threaded portion" are the samples ruptured at the threaded portion, and those mentioned as "neck portion" are the samples ruptured at the cylindrical neck portion.

TABLE 3

| | | Bolt property | | | | Equation 1 (Numerator & Denominator: 10²) | | | ① | Ruptured | Head production ② | ③ |
|---|---|---|---|---|---|---|---|---|---|---|---|---|
| SNo | Steel material | Ho | Hs | Ao | As | Numerator | Denominator | K | GPa | portion | 10° C. | |
| 1 | AF | 340 | 550 | 140 | 84.3 | 476 | 464 | 1.03 | 1.82 | Threaded portion | 71 | ○ |
| 2 | AF | — | — | — | — | — | — | — | — | — | 55 | X |
| 3 | AF | — | — | — | — | — | — | — | — | — | 60 | X |
| 4 | AF | 390 | 560 | 109.3 | 84.3 | 426 | 472 | 0.90 | 1.85 | Threaded portion | 70 | ○ |
| 5 | AF | 380 | 560 | 109.3 | 84.3 | 415 | 472 | 0.88 | 1.87 | Threaded portion | 75 | ○ |
| 6 | AF | 330 | 560 | 109.3 | 84.3 | 361 | 472 | 0.76 | 1.69 | Neck portion | 80 | ○ |
| 7 | AF | 380 | 560 | 109.3 | 84.3 | 415 | 472 | 0.88 | 1.89 | Threaded portion | 75 | ○ |
| 8 | AQ | 330 | 560 | 109.3 | 84.3 | 361 | 472 | 0.76 | 1.64 | Neck portion | 75 | ○ |
| 9 | AF | 390 | 550 | 140 | 84.3 | 546 | 464 | 1.18 | 1.79 | Threaded portion | 70 | ○ |
| 10 | AF | 400 | 550 | 140 | 84.3 | 560 | 464 | 1.21 | 1.85 | Threaded portion | 64 | ○ |
| 11 | AQ | 390 | 540 | 140 | 84.3 | 546 | 455 | 1.20 | 1.84 | Threaded portion | 69 | ○ |
| 12 | AQ | 340 | 540 | 140 | 84.3 | 476 | 455 | 1.05 | 1.76 | Threaded portion | 71 | ○ |
| 13 | AQ. | 350 | 540 | 140 | 84.3 | 490 | 455 | 1.08 | 1.77 | Threaded portion | 67 | ○ |
| 14 | BQ | 280 | 472 | 109.3 | 84.3 | 306 | 398 | 0.77 | 1.34 | Neck portion | 75 | ○ |
| 15 | BQ | 280 | 472 | 109.3 | 84.3 | 306 | 398 | 0.77 | 1.35 | Neck portion | 70 | ○ |
| 16 | BF | 290 | 422 | 109.3 | 84.3 | 317 | 356 | 0.89 | 1.48 | Threaded portion | 70 | ○ |

Ho: Minimum Vickers hardness of cylindrical neck portion (Hv)
Ao: Effective cross-sectional area of cylindrical neck portion (mm2)
Hs: Vickers hardness of threaded portion (Hv)
As: Effective cross-sectional area of threaded portion (mm2)
AF, BF: particle dispersion type fibrous grain structure material
AQ, BQ: quenched and tempered material
①: Bolt tensile strength
②: Heating temperature of head portion (threaded portion was not heated)
③: Capability of warm heading of head portion The above mentioned warm working process allowed a production of a bolt with a hexagonal head satisfying the standard of JIS, even with Material A which had a problem in cold heading. The threaded portion of the obtained bolt had high hardness of Hv 420 or more, whereas the cylindrical neck portion had hardness of Hv 280-400 and high resistance to delayed fracture (corresponding to a tensile strength of 880-1,250 MPa). The JIS bolts were ruptured at the threaded portion when K was 0.8 or more, while when K was less than 0.8, the JIS bolts were ruptured at the cylindrical neck portion. In the case of the rupture at the cylindrical neck portion, the tensile strength of the bolt was lower than that in the case of the rupture at the threaded portion, and thus the strength property of the bolt was not satisfied. That is, the aimed bolt was obtained by performing warm forming of the material in such a manner that K is set at 0.8 or more.

INDUSTRIAL APPLICABILITY

The high-strength bolt can be provided which still has a tensile strength of 1,200 MPa or more, while exhibiting excellent ductility and delayed facture resistance, and further has an excellent impact toughness which had not been obtained in the conventional high-strength bolt.

The invention claimed is:

1. A high-strength bolt having a tensile strength of 1.2 GPa or more and comprising a threaded portion and a cylindrical neck portion,
wherein the bolt has K of 0.8 or more and satisfies Ho<Hs, Ho and Hs being hardness obtained after a rolling process for forming the threaded portion and a heading process for forming a head portion, K being defined by the following equation (1):

$$(Ao \times Ho)/(As \times Hs) = K \tag{1}$$

wherein
Ao is an effective cross-sectional area of the cylindrical neck portion,
Ho is a Vickers hardness of a portion at which Ao is measured, the Vickers hardness being measured in accordance with a testing method prescribed in JIS-Z-2244,
As is an effective cross-sectional area of the threaded portion, and
Hs is a Vickers hardness of a portion at which As is measured, the Vickers hardness being measured in accordance with a testing method prescribed in JIS-Z-2244,
the Vickers hardness being measured on a cross section of a sample obtained by cutting the bolt along an axis thereof and buffing the cross section to mirror finish.

2. The high-strength bolt according to claim 1, comprising: less than 0.7 percent by weight of C; 3 percent by weight or less of Si; 3 percent by weight or less of Mn; 3 percent by weight or less of Cr; 0.5 percent by weight or less of Al; 0.3 percent by weight or less of O; 0.3 percent by weight or less of N; 5.0 percent by weight or less of Mo; 10 percent by weight or less of Ni; 2.0 percent by weight or less of Cu; 1.0 percent by weight or less of Nb; and the balance substantially of Fe and unavoidable impurities.

3. The high-strength bolt according to claim 1, having a particle dispersion type fibrous grain structure.

4. The high-strength bolt according to claim 2, having a particle dispersion type fibrous grain structure.

* * * * *